United States Patent [19]

Francois et al.

[11] Patent Number: 4,971,688

[45] Date of Patent: Nov. 20, 1990

[54] APPARATUS FOR SEPARATING AT LEAST TWO ELEMENTS CONTAINED IN A LIQUID OR GASEOUS FLUID BY MEANS OF AN ABSORBENT FILTERING MATERIAL

[75] Inventors: Combes J. François, Lyon; Chatelin Roger, L-Zanne; Wattiez Daniel, Lozanne; Gavet Loues, Lyon, all of France

[73] Assignee: Centre Technique Industriel: Institut Textile de France, Bagneux Cedex, France

[21] Appl. No.: 388,573

[22] Filed: Aug. 1, 1989

[30] Foreign Application Priority Data

Aug. 19, 1988 [FR] France ................. 88 11069

[51] Int. Cl.⁵ ................. B01D 15/00; B01D 53/14
[52] U.S. Cl. ................. 210/94; 55/387; 55/475; 210/289; 210/350
[58] Field of Search ................. 55/387, 475; 210/94, 210/263, 287, 289, 350, 351

[56] References Cited

U.S. PATENT DOCUMENTS

| 191,131 | 5/1877 | Gainey | 210/350 |
| 3,374,052 | 3/1968 | Fan et al. | 55/475 |
| 4,157,959 | 6/1979 | Wen et al. | 210/274 |
| 4,624,789 | 11/1986 | Fan et al. | 210/661 |
| 4,776,962 | 10/1988 | Wakeman | 210/351 |

FOREIGN PATENT DOCUMENTS

| 0100994 | 2/1984 | European Pat. Off. |
| 0152711 | 8/1985 | European Pat. Off. |
| 0259000 | 3/1988 | European Pat. Off. |
| 2442067 | 6/1980 | France |

Primary Examiner—Ivars Cintins
Attorney, Agent, or Firm—Ladas & Parry

[57] ABSTRACT

The apparatus relates to separation apparatus (1) for separating at least two elements contained in a liquid or gaseous fluid, the apparatus including a separation chamber (60) of adjustable height delimited by a piston (30) slidably mounted in a piston cylinder (2). A variable pressure may be applied to the face (34) of the piston (30) situated outside the chamber (60). The piston cylinder (2) is mounted in a protection cylinder (6) in which a fluid may flow for maintaining a given temperature inside the separation chamber (60).

9 Claims, 1 Drawing Sheet

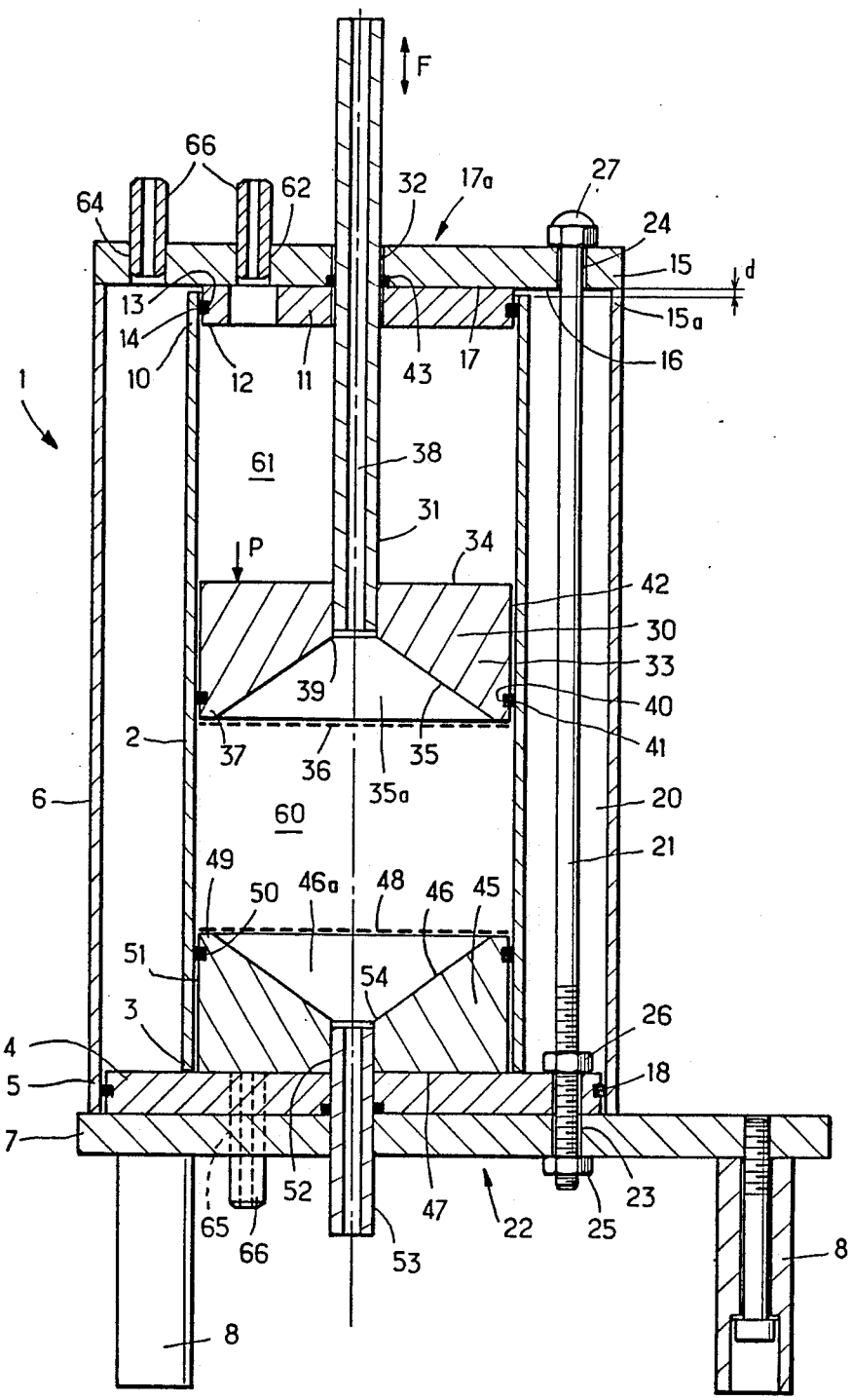

APPARATUS FOR SEPARATING AT LEAST TWO ELEMENTS CONTAINED IN A LIQUID OR GASEOUS FLUID BY MEANS OF AN ABSORBENT FILTERING MATERIAL

The present invention relates to apparatus for separating at least two elements contained in a liquid or gaseous fluid by means of an absorbent or filtering material, the apparatus comprising:

a separation chamber delimited by a cylindrical side wall and two opposite end faces; and an inlet duct and an outlet duct opening out into said separation chamber in the vicinity of respective ones of said end faces;

said separation chamber being intended to contain an absorbant or filtering material through which the fluid to be treated flows on being inserted into said separation chamber via said inlet duct and removed after treatment via said outlet duct.

BACKGROUND OF THE INVENTION

Such apparatuses are commercially available and they use a wide variety of absorbent or filtering materials including textiles, papers, resins, films, and filtering particles, and having a wide variety of properties, with filtering being physical or by ion exchange.

Existing apparatuses have a separation chamber of constant volume and unchanging dimensions, and the filtering material is subjected within such apparatuses to a pressure or a compression factor which is likewise invariable. In general, these apparatuses operate in a medium having a substantially constant ambient temperature, and in normal use of such apparatuses in industry, the absorbent or filtering material is always the same, or, at least, is rarely changed.

When such apparatuses are to be used for making comparative tests or quality control operations on absorbent or filtering materials existing on the market or manufactured in a factory producing absorbent or filtering materials, difficulties arise since the user is obliged to select a separation apparatus capable of accepting the thickness of absorbent or filtering material, and a pressure and a temperature corresponding to the absorbent material that is to be tested, and comparative tests require a plurality of apparatuses giving rise to high costs both when purchasing an installation and while maintaining it, and in addition the apparatuses occupy considerable space even though some of them are little used.

The object of the present invention is to provide an apparatus enabling a large number of absorbent or filtering materials to be used in the apparatus without modifying its structure and regardless of the nature or the properties of the material concerned, said apparatus being simple to use, particularly when changing absorbent or filtering materials, and also being easy to manufacture and being cheap both to purchase and to maintain. In addition, the apparatus should be suitable for performing tests under a wide variety of operating conditions, with respect both to temperature and to pressure.

Proposals have already been made, in particular in European patent specification EP-A-0 152 711, for an apparatus in which the volume and the dimensions of the separation chamber are variable, since one of its end faces is constituted by a piston which is slidably mounted within the enclosure under the effect of drive means. In that document, the liquid to be treated is delivered via the piston rod which is hollow.

However, this apparatus does not satisfy all of the objects of the invention as specified above.

The present invention provides an apparatus for separating at least two elements contained in a liquid or gaseous fluid by means of an absorbent or filtering material, which satisfies the specified objects.

SUMMARY OF THE INVENTION

This apparatus is of conventional type as described in the document EP-A-0 152 711, insofar as it comprises:

a separation chamber delimited by a cylindrical side wall and two opposite end faces, one of the two end faces being adjustable relative to the other in such a manner as to be able to adjust the volume of the chamber to the thickness of the layer of absorbent or filtering material disposed inside said chamber and so as to be able to adjust the pressure exerted on said material by said end faces; and an inlet duct and an outlet duct opening out into said separation chamber in the vicinity of respective one of said end faces.

According to the invention, the apparatus further comprises:

a piston cylinder standing on a bottom wall and closed in sealed manner by a lid wall;

a support plate on which said bottom wall is fixed;

a lid plate fixed above said lid wall and constituting, together therewith, a closure lid;

a protection cylinder disposed concentrically about said piston cylinder between said support plate and said lid plate in such a manner as to provide a sealed annular chamber around said piston cylinder;

orifices opening out into said annular chamber to enable a fluid to flow through said chamber;

tie rods disposed inside said annular chamber and interconnecting said support plate and said lid plate; and a piston sliding inside said piston cylinder and provided with a guide rod passing through said closure lid, said separation chamber being situated between said bottom wall and the bottom face of said piston.

It is thus possible to cause a fluid, e.g. water raised to a determined temperature, to flow through the sealed annular chamber surrounding the separation chamber, thereby enabling the absorbent or filtering material to be tested at said temperature.

For experimental purposes, the apparatus is particularly well adapted to comparing the characteristics of different media with one another while varying the conditions of pressure, temperature, and density of the absorbent material (assuming the material is compressible) in order to predetermine the optimum conditions of use for a given absorbent material, or better still to determine optimum conditions of use for an ion exchanger as a function of its exchange kinetics, and this can be done at a desired purification rate for the purposes of determining the dimensions of an installation and for investigating coupling between various different separation techniques.

Preferably, the top face of the lid wall is situated above the top end of the piston cylinder.

By virtue of this structure, the cylindrical side wall of the separation chamber is not subjected to longitudinal stresses since the chamber can expand freely in the longitudinal direction.

The space delimited by said lid wall and the top face of said piston is sealed and is connected to a source of fluid under pressure via an orifice provided through said closure lid. Said guide rod is hollow and delimits said inlet duct.

It is thus simple to modify the compression factor of the absorbent or filtering material.

In a particular embodiment of the invention, the apparatus includes firstly a distribution cavity for distributing the fluid to be treated and situated at the inlet end into which said inlet duct opens out, said distribution cavity communicating with said separation chamber via a rigid screen forming one of said end faces, and secondly a fluid-collecting cavity for collecting the fluid after treatment and situated at the outlet end into which said outlet duct opens out, said fluidcollecting cavity communicating with said separation chamber via a second rigid screen forming the other one of said end faces.

By virtue of this structure, the fluid to be treated flows uniformly over the entire width of the layer of absorbent or filtering material and no chimney effect occurs between the inlet point of the fluid to be treated into the separation chamber and the outlet point for the fluid after treatment.

The piston comprises a cylindrical block having an annular end face including a first rigid screen fixed to said annular end face. The distribution cavity is preferably conical in shape and is provided in said cylindrical block above said first rigid screen running from said annular end face, and the inlet duct opens out into the top portion of said distribution cavity.

A counter piston having an annular top end face is disposed inside said piston cylinder above said bottom wall. A second rigid screen is fixed to said annular end face. A conical fluid-collecting cavity is thus provided in said counter piston running from said annular end face. The outlet duct opens out into the bottom portion of said fluid-collecting cavity.

BRIEF DESCRIPTION OF THE DRAWING

An embodiment of the invention is described by way of example with reference to the accompanying drawing, in which the sole figure of the accompanying drawing which is a diagrammatic vertical section through an apparatus in accordance with the invention.

DETAILED DESCRIPTION

As can be seen in the drawing, separation apparatus 1 comprises a piston cylinder 2 disposed vertically and standing via its bottom end 3 on a bottom wall 4 which projects outside the piston cylinder 2 and which is fitted inside the bottom portion 5 of a hollow protection cylinder 6 disposed coaxially around the piston cylinder 2. The bottom wall 4 and the bottom end 5 of the protection cylinder 6 stand on a horizontally disposed plate 7 which serves as the support for the apparatus. Legs 8 are disposed beneath the support plate 7, with there being three such legs in the example shown in the drawing, said legs being intended to enable the apparatus 1 to stand on a bench (not shown).

The top end 10 of the piston cylinder 2 is closed by one lid wall 11 which is in the form of a circular disk whose diameter is close to the inside diameter of the piston cylinder 2 and which is provided around its periphery 12 with a groove 13 that receives a sealing ring 14 for providing sealing.

The top end 15a of the protection cylinder 6 is also closed by a lid plate 15 disposed above the protection cylinder 6. The protection cylinder 6 is taller than the piston cylinder 2 so that the bottom face 16 of the lid plate 15 coincides with the top face 17 of the lid wall 11 and so the top end 10 of the piston cylinder 2 is kept at a distance d from the bottom face 16 of the lid plate 15. The lid plate 15 and the lid wall 11 are preferably assembled together via their adjacent faces 16 and 17 so as to constitute a closure lid 17a for the piston cylinder 2 and for the protection cylinder 6. Similarly, the bottom wall 4 is assembled on the support plate 7, and a sealing ring 18 is likewise disposed between the bottom end of the protection cylinder 6 and the bottom wall 4.

A plurality of tie rods 21 are disposed vertically in the annular space 20 between the piston cylinder 2 and the protection cylinder 6, these rods passing both through the assembly 22 constituted by the bottom, plate 4 and the support plate 7 via respective bores 23 through said assembly 22, and secondly through the lid plate 15 via respective bores 24 provided therethrough. Each tie rod 21 is fixed to the assembly 22 by a nut 25 and a counter nut 26 and has an end nut 27 disposed above the lid plate 15 for closing the piston cylinder 2 and the protection cylinder 6 in such a manner as to ensure the annular chamber 20 is sealed.

The protection cylinder 6 performs several functions. Firstly it provides a protective function in the event of the piston cylinder 2 breaking. It also serves to maintain the separation between the support plate 7 and the lid plate 15 so as to ensure that the distance d between the top end 10 of the piston cylinder 2 and the bottom 16 of the lid plate 15 is maintained.

A piston 30 is slidably mounted inside the piston cylinder 2 and is provided with a guide rod 31 passing through the closure lid 17a via a vertical bore 32. The piston 31 comprises a cylinder block 33 whose top face 34 is plane and whose bottom face 35 is bell-shaped or cone-shaped, with a first rigid screen 36 or grid being fixed to the annular bottom end face 37 of the cylindrical block 33. A distribution cavity 35a is thus provided between the first screen 36 and the bottom face 35. The guide rod 31 is hollow and possesses a longitudinal inlet duct 38 opening out into the top portion 39 of the distribution cavity 35a. A groove 40 for receiving a piston ring 41 is provided in the side wall 42 of the piston 30. A sealing ring 43 is provided in the bore 32.

A counter piston 45 having a top face 46 in the form of a conical cup is disposed inside the piston cylinder 2 above the bottom wall 4. The counter piston 45 has its bottom face 47 glued to the bottom wall 4. A second rigid screen or grid 48 is fixed to the top annular end face 49 of the counter piston 45, and a piston ring 50 is provided between the side face 51 of the counter piston 45 and the piston cylinder 2. A fluidcollecting cavity 46a is thus provided between the second screen 48 and the top plate 46 of the counter piston 45. A vertical bore 52 passes through the counter piston 45 and the assembly 22, and an outlet tube 53 is received in the bore 52, opening out into the bottom portion 54 of the fluid-collecting cavity 46a.

It is preferable, but optional, for the counter piston 45, the outlet tube 53, and the second rigid screen 48 to be identical in configuration to the piston 30 provided with its guide rod 31.

The rigid screens 36 and 48 constitute the opposite ends of a separation chamber 60 for receiving an absorbent filtering material (not shown). The fluid to be treated is admitted into the chamber 60 via the inlet duct 38 and it spreads uniformly over the first rigid screen 36 by virtue of the bell-shape of the bottom face 35 in the cylindrical block 33. The purified fluid flowing through the rigid screen 48 is collected by the outlet tube 53 at the bottom 54 of the cup 46. The fluid to be treated may naturally be caused to flow in the opposite direction, i.e. from the tube 53 towards the duct 38.

The top face 34 of the piston 30 and the lid wall 11 delimit a second chamber 61 which communicates with a source of fluid under pressure (not shown) via an orifice 62 provided through the closure lid 17a, there being a second orifice (not shown) for putting the second chamber 61 in communication with a pressure gauge and/or a safety valve may also be provided in the closure plug 17a.

The annular space 20 situated between the piston cylinder 2 and the protection cylinder 6 communicates with a source of fluid (not shown) via an orifice 64 provided through the lid plate 15 and an orifice 65 provided through the assembly 22 comprising the bottom wall 4 and the support plate 7. Connectors 66 in the form of respective tubes are crimped inside the orifices 62, 64, and 65.

It is thus possible to cause fluid, e.g. water, at a given temperature to flow inside the annular space 20 so as to enable the apparatus to have its temperature thermostatically controlled in operation. Air under pressure may be inserted via the orifice 62 so a to urge the piston 30 downwards, thereby compressing the absorbent or filtering material contained inside the chamber 60.

The rigid screens or grids 36 and 48 include a plurality of vertical orifices through which the fluid to be treated flows. The rigid screens 36 and 48 are made of a material which withstands corrosion. The rigid screens 36 and 48 are respectively fixed to the annular end faces 37 and 49 of the cylindrical block 33 and of the counter piston 45, or else they are pressed against these annular end faces while the apparatus 1 is in use by the absorbent or filtering material contained in the chamber 60 between the two rigid screens 36 and 48 by virtue of the vertical downwards displacement of the guide rod 31 along arrow F or by virtue of the pressure P exerted by the pressure source on the top face 34 of the piston 30. The piston 30 sliding in the piston cylinder 2 constitutes means for changing the distance between the end faces 36 and 48 of the separation chamber 60. The top face 34 of the piston 30, the second chamber 61, and the orifice 62 all associated with the source of fluid under pressure, constitute the means for changing the compression factor of the absorbent or filtering material.

The fluid to be treated may flow through the chamber 60 either upwards or downwards, either under the effect of gravity, or under the effect of a delivery pump installed in the inlet duct, or else by the effect of a suction pump installed in the outlet duct.

The absorbent or filtering material contained in the separation chamber 60 is replaced as described below.

In order to replace the absorbent filtering material, the chamber 61 is put into communication with the outside atmosphere by removing the end nuts 27, closing the inlet duct 38, and putting the outlet tube 53 into communication with a source of fluid under pressure, e.g. water. The pressure exerted in the chamber 60 drives the piston 30 upwards, and when the top face 34 of the piston 30 comes into contact with the closure lid 17a, the closure lid is raised by the piston 30 until the piston 30 is expelled from the piston cylinder 2. The absorbent or filtering material can then be withdrawn from the chamber 60 and replaced by an absorbent or filtering material of the same type or of a different type, having the same thickness or having a different thickness.

The apparatus is returned to the operative condition in opposite manner by inserting the piston 30 into the top end 10 of the piston cylinder 2, and then putting the closure lid 17a into place. After the end nut 27 has been tightened and after the inlet duct 38 and the outlet tube 53 have been properly connected, the connector 66 of the orifice 62 is connected to the source of fluid under pressure, thereby enabling the chamber 61 to be put under pressure thus causing the piston 30 to move downwards and compress the absorbent or filtering material.

The various component parts of the apparatus described above can be made of various different materials. Given the wide range of conditions under which the apparatus may be used, it is preferable for the materials chosen to be suitable for withstanding media which may be acid, neutral, or basic. For laboratories, the piston cylinder 2 is preferably made of a glass which withstands high temperatures, such as "Pyrex", and should include graduations enabling the distance between the rigid screens 36 and 48 to be measured directly by eye, with the other components apart from the sealing rings (including piston rings) and the nuts and bolts being made of a strong transparent plastic material, preferably of the "Plexiglass" type, or else being made of polycarbonate or of stainless steel.

The person skilled in the art can make various modifications to the apparatus as described. In particular, the closure lid 17a may be made as a single part, and the assembly 22 comprising the support plate 7 and the bottom wall 4 may likewise be made as a single part together with the bottom cylinder 45 The distance between the bottom wall and the lid plate 15 may be maintained by hollow cylindrical sleeves surrounding each of the tie rods 21 and disposed between the bottom wall 4 and the lid plate 15.

We claim:

1. An apparatus for separating at least two elements contained in a liquid or gaseous fluid, said apparatus comprising:

a support plate on which a bottom wall is fixed;

a piston cylinder having a first end positioned on said bottom wall and a second end sealably closed by a lid wall and a sealing means;

a lid plate fixed above said lid wall and constituting, together therewith, a closure lid;

a piston slidably displaceable within said piston cylinder and provided with a guide rod passing through said closure lid;

a separation chamber situated below a bottom face of said piston and having absorbent or filtering material disposed therein, the volume of said separation chamber being adjustable by the movement of said piston so that said absorbent or filtering material can be compressed;

an inlet duct and an outlet duct in fluid communication with said separation chamber;

a protection cylinder disposed concentrically about said piston cylinder between said support plate and said lid plate in such a manner as to provide a sealed annular chamber around the piston cylinder;

at least one orifice in fluid communication with said annular chamber to enable fluid to flow through said annular chamber; and connection means disposed inside said annular chamber and interconnecting said support plate and said lid plate.

2. Apparatus according to claim 1, wherein a top face of the lid wall is situated above said second end of the piston cylinder.

3. Apparatus according to claim 1, wherein a space delimited by said lid wall and a top face of said piston is sealed and is connected to a source of fluid under pressure through at least one orifice provided through said closure lid, and wherein said guide rod is hollow and delimits said inlet duct.

4. Apparatus according to claim 1, wherein the piston comprises a cylindrical block having an annular end face and including a first rigid screen fixed to said annular end face, wherein a conically-shaped distribution cavity is formed inside said cylindrical block above said first rigid screen running from said annular end face, and wherein said inlet duct is connected to a top portion of said distribution cavity.

5. Apparatus according to claim 4, wherein a counter piston having an annular top end face is disposed inside said cylinder above said bottom wall, wherein a second rigid screen is fixed to said annular end face, wherein a conically-shaped fluid-collecting cavity is provided inside said counter piston running from said annular end face, and wherein the outlet duct is connected to a bottom portion of said fluidcollecting cavity.

6. Apparatus according to claim 5, wherein the piston cylinder is made of a glass capable of withstanding high temperatures and includes graduations enabling the distance between the first and second rigid screens to be measured.

7. Apparatus according to claim 5, wherein the piston, the counter piston, and the first and second rigid screens are made of a plastics material which withstands acid, neutral, and basic media.

8. Apparatus according to claim 1, wherein said protection cylinder is made of a plastics material that is transparent.

9. The apparatus according to claim 1, wherein the connection means comprises tie rods.

* * * * *